United States Patent [19]

Roberts et al.

[11] Patent Number: 5,118,049

[45] Date of Patent: Jun. 2, 1992

[54] DRAG STACK RETAINER

[75] Inventors: Dennis E. Roberts, Owasso; Robert L. Carpenter, Tulsa, both of Okla.

[73] Assignee: Zebco Corporation, Tulsa, Okla.

[21] Appl. No.: 528,022

[22] Filed: May 23, 1990

[51] Int. Cl.[5] ........................................... A01K 89/015
[52] U.S. Cl. ..................................... 242/268; 242/312
[58] Field of Search ............... 242/268, 264, 245, 246, 242/260, 261, 262, 312, 318

[56] References Cited

U.S. PATENT DOCUMENTS

| | | | |
|---|---|---|---|
| 1,697,851 | 1/1929 | Case | 242/268 |
| 1,789,178 | 1/1931 | Johnson | 242/259 |
| 1,832,421 | 11/1931 | Pflueger | 242/268 |
| 2,150,088 | 3/1939 | White | |
| 2,573,240 | 10/1951 | Berlinger | |
| 2,623,704 | 12/1952 | Bergman et al. | |
| 2,686,016 | 8/1954 | Kilian | |
| 3,612,437 | 10/1971 | Allebach | 242/261 |
| 4,200,248 | 4/1980 | Puryear | 242/245 |
| 4,549,702 | 10/1985 | Councilman | 242/246 |
| 4,570,878 | 2/1986 | Nakajima | |
| 4,572,455 | 2/1986 | Noda | |
| 4,586,674 | 5/1986 | Nakajima | |
| 4,779,819 | 10/1988 | Emura et al. | 242/268 |
| 4,901,944 | 2/1990 | Aoki | 242/260 |

*Primary Examiner*—Katherine Matecki
*Attorney, Agent, or Firm*—Wood, Phillips, VanSanten, Hoffman & Ertel

[57] ABSTRACT

An improved fishing reel of the type having a first shaft with a rotational axis and a free end, a gear with a bore therethrough and mountable on the first shaft by direction of the first shaft free end through the gear bore and sliding of the gear axially in a first direction relative to the first shaft, at least one drag washer having a bore through which the first shaft extends and movable axially along the first shaft, a drag actuator rotatable in a first direction for advancing at least part of the drag actuator in the first direction to increase drag by moving the gear and one drag washer axially towards each other and rotatable oppositely to the first direction to decrease drag by allowing the gear and one drag washer to move away from each other. The improvement consists of structure separate from the drag actuator for blocking axial movement of at least one of the gear and one drag washer relative to the first shaft in a direction opposite to the first direction to thereby prevent escape of the one of the gear and one drag washer by axial movement relative to the shaft off of the free end of the first shaft.

21 Claims, 1 Drawing Sheet

DRAG STACK RETAINER

BACKGROUND OF THE INVENTION

1. Field of the Invention

This invention relates to fishing reels with a drag adjustment feature and, more particularly, to a structure for facilitating manufacture of a drag assembly and preventing inadvertent separation of parts on the drag assembly during disassembly/repair. The invention also contemplates a method of assembling the drag adjustment structure.

2. Background Art

It is known to mount a gear rotatably relative to a shaft and to provide drag structure to produce a variable friction force on the gear that causes the gear to follow rotation of the shaft. An exemplary structure is shown in U.S. Pat. No. 4,586,674, to Nakajima. To assemble a drag structure, such as that in Nakajima, the shaft to which the gear is mounted is first put in place on a frame. This is frequently accomplished by a staking operation. At least one drag washer is assembled to the shaft on each axial side of the gear. The side cover is then put in place after which the drag actuator, preferably having a star wheel, is threaded onto the end of the shaft. The crank handle is then put in place. In operation, the drag actuator selectively increases/decreases the frictional force between the drag washers and gear as it is adjusted on the shaft. At least one of the drag washers is keyed to rotate with the shaft. As the frictional force increases, so does the drag.

One particularly vexatious problem with structures such as Nakajima's is that the numerous elements in the drag assemblies often become separated from the reel when the reel is being repaired. Typically, the side cover for the reel encases several different operating mechanisms. To access any of these mechanisms, the side cover is removed, which requires that the crank handle and drag actuator be first disassembled. Once the drag actuator is removed, certain of the drag elements are free to slide off of the free end of the shaft. Once this occurs, it is mandatory, for proper reel operation, that the various parts be reassembled in a precise order and relationship. This does not always occur, particularly when repairs are carried out by the user, as in a boat, and may result in reel malfunction.

In the Nakajima structure, removal of the handle and drag actuator alone appears to release at least three separate elements associated with the drag assembly.

SUMMARY OF THE INVENTION

The present invention is specifically directed to overcoming the above-enumerated problems in a novel and simple manner.

The present invention contemplates an improvement in a fishing reel of the type having a first shaft with a rotational axis and a free end, a gear with a bore therethrough and mountable on the first shaft by direction of the first shaft free end through the gear bore and sliding of the gear axially in a first direction relative to the first shaft, at least one drag washer having a bore through which the first shaft extends and movable axially along the first shaft, a drag actuator rotatable in a first direction for advancing at least part of the drag actuator in the first direction to increase drag by moving the gear and one drag washer axially towards each other and rotatable oppositely to the first direction to decrease drag by allowing the gear and one drag washer to move away from each other.

The improvement consists of structure separate from the drag actuator for blocking axial movement of at least one of the gear and one drag washer relative to the first shaft in a direction opposite to the first direction to thereby prevent escape of the one of the gear and one drag washer by axial movement relative to the shaft off of the free end of the first shaft.

With the inventive structure, it is possible to construct a reel wherein the drag actuator and cover can be removed, to gain access to the operating mechanism, without the stacked drag elements separating from their associated shaft, as when the reel is tipped on its side.

The blocking structure can take any of a variety of different forms, and is preferably removably attached to the shaft, as by snap-fitting. Alternatively, an O-ring or the like can be employed. In any event, it is desirable that the shaft have an undercut to which the blocking element is attached. In the event of an O-ring or snap ring being used, an annular undercut is preferred. A formed piece of wire could be used as a further alternative structure.

In a preferred form, the drag actuator has an annular body/sleeve which is in axially overlapping relationship with the blocking structure through at least part of the operating range for the drag actuator. In a preferred form, the drag actuator sleeve has a stepped internal bore with a first portion which is threaded to the shaft and a second portion of a larger diameter that surrounds and accommodates the blocking structure.

The invention also contemplates a fishing reel of the type having a rotatable spool, a crank handle, a shaft with a first axis and a free end operable by the crank handle to cause rotation of the spool to thereby direct line onto the spool, a gear mounted on the shaft for rotation relative thereto about the first axis, drag applying structure on the shaft including at least one drag washer for applying a frictional force to the gear to thereby cause the gear to follow rotation of the first shaft, with at least one of the gear and one drag washer being movable axially off of the free end of the first shaft, a drag actuator for the drag applying structure and being selectively movable between a no drag position and a full drag position, and blocking structure separate from the drag actuator for preventing axial movement of at least one of the gear and one drag washer axially off of the free end of the first shaft.

The present invention also contemplates a method of assembling a drag assembly on a shaft on a fishing reel with a free end, which method consists of the steps of placing at least one drag washer and a gear to be driven by the shaft over the free end of the shaft, sliding the at least one drag washer and gear axially in a first direction relative to the shaft, placing a retainer/blocking element on the shaft to prevent the at least one drag washer and gear from sliding axially oppositely to the first direction and off of the free end of the shaft, and assembling a drag actuator on the shaft.

With the claimed method, the drag assembly can be readily assembled and other parts of the reel can be disassembled without fear of the drag assembly parts escaping from the remainder of the reel.

The retainer/blocking element can be put in place either before or after a cover is placed on the reel.

DETAILED DESCRIPTION OF THE DRAWINGS

Figure 1:
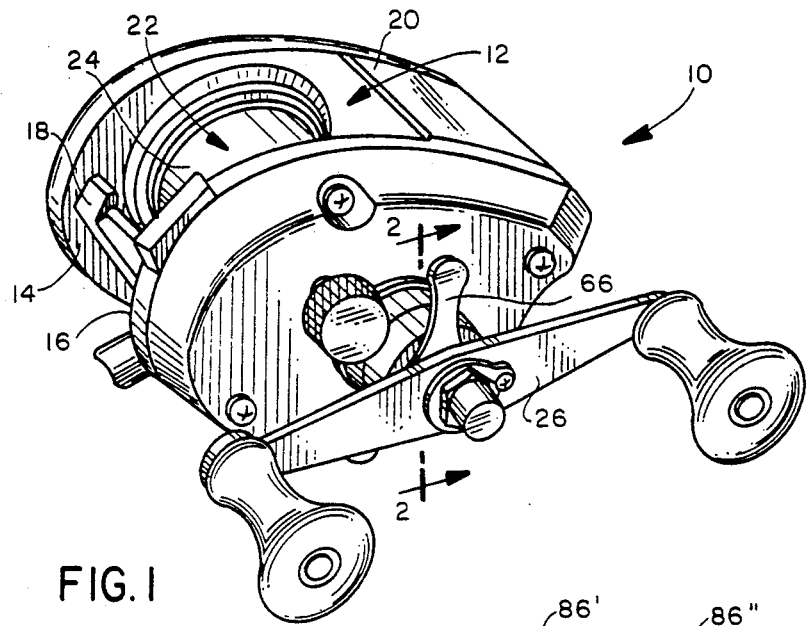
FIG. 1 is a perspective view of a casting style reel that is exemplary of one type of reel suitable for incorporation of a retainer/blocking structure for a drag assembly according to the present invention.

An exemplary casting style reel, suitable for incorporation of the present invention, is shown at 10 in FIG. 1, with the details of the inventive structure shown in FIGS. 2-6. The casting reel 10 consists of a frame 12 made up of laterally spaced side frame members 14, 16, interconnected by posts 18, 20 so as to cooperatively define a line storage space 22 and a foundation for the remainder of the operating mechanism for the reel 10. A spool 24 is mounted for rotation between the side frame members 14, 16 and is operatively driven by a crank handle 26 that is rotatable about an axis 28. The axis 28 can be coincident with the axis of rotation of the spool 24, or it can be offset as shown in the depicted embodiment, so that rotation from the crank handle 26 is transmitted through a shaft 30, a gear 32 thereon, through an intermediate gear 34, shown schematically in FIGS. 2 and 3, to the spool 24.

Figure 2:
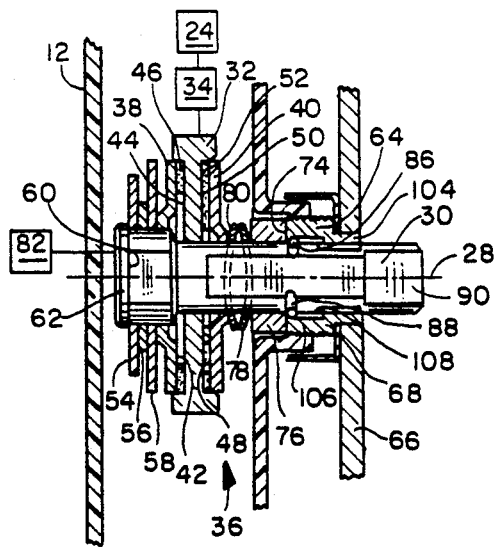
FIG. 2 is a cross-sectional view of the drag assembly taken along line 2—2 of FIG. 1 and with the drag in a no/low drag setting.
Figure 3:
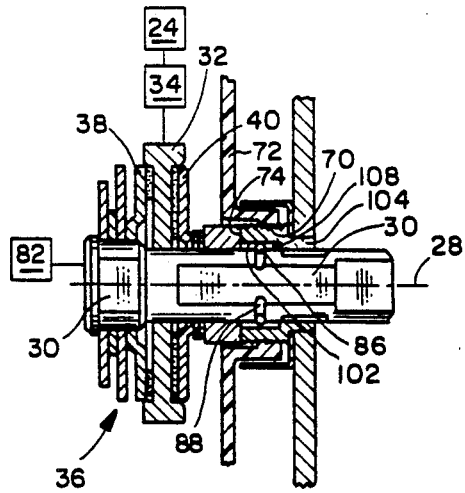
FIG. 3 is a view as in FIG. 2 of a slightly modified form of the reel and with the drag tightened.

The drag stack/assembly, shown at 36 in FIGS. 2 and 3, determines at what torque the crank handle 26 will slip during operation and also what force must be applied to the line to cause the spool 24 to rotate and pay out line with the reel in its retrieve mode. To accomplish this end, the gear 32 is mounted for both rotation and axial movement relative to the crank shaft 30. Drag washers 38, 40 are provided on the axially oppositely facing surfaces of the gear 32. The drag washer 38 has an annular surface 42 facing an axially inwardly facing surface 44 on the gear 32. A high friction material 46 is provided either on one of the gear 32 and washer 38 or loosely therebetween. Drag washer 40 has an axially inwardly facing surface 48 confronting the axially outwardly facing gear surface 50 with a high friction material 52 disposed therebetween.

Spaced axially inwardly from the drag washer 38 is a stack of three gears/washers 54, 56, 58, with the innermost gear/washer 54 abutting an annular shoulder 60 defined by an enlargement 62 on the inner end of the shaft 30, to thereby limit axial shifting inwardly of the entire drag stack/assembly 36. The gears/washers 54, 56, 58 may generate friction between themselves and the drag washer 38 and/or may constitute part of the mechanisms performing other functions in the reel, i.e. such as anti-reverse mechanisms. The number and exact configuration of the various friction producing washers is a matter of design choice and is not critical to the present invention.

To control the reel drag force, a drag actuator 64 is provided. The drag actuator 64 has radially extending legs 66 to facilitate operation thereof by the user. The actuator 64 has a cylindrical body/sleeve 68 which surrounds the shaft 30 and is either threadably engaged to the shaft 30, as in FIG. 2, or within an opening 70 on a cup-shaped side cover 72, as in FIG. 3. Rotation of the drag actuator 64 in one direction advances an annular edge 74 thereon against a transition ring 76 and in turn against an axially inwardly opening cup washer 78, an axially outwardly opening cup washer 80 and the drag washer 40. As the actuator 64 is rotated to increase drag, the edge 74 moves further axially inwardly with respect to the shaft 30, compresses the washers 78, 80 and in so doing squeezes the gear 32, with a progressively increasing force, between the friction material 46, 52. At least one, and preferably both of the drag washers 38, 40, are keyed against rotation relative to the shaft 30 so that the friction force developed between the gear 32 and drag washers 38, 40 causes the gear 32 to follow rotation of the drag washers 38, 40 and resultingly the shaft 30. The lesser the frictional gripping force between the gear 32 and drag washers 38, 40, the lesser the drag, and vice versa.

The present invention is directed to structure for facilitating assembly of the drag stack/assembly 36 and for preventing separation of elements thereof during repair of the reel, as when the cover 72 and the drag actuator 64 are removed from the reel frame 12. The present invention can be best understood by first describing the assembly of the drag stack/assembly 36.

The shaft 30 is first journalled for rotation relative to the frame 12 by any of a number of conventional structures, shown schematically at 82 in FIGS. 2 and 3. Once the shaft 30 is in place, the following elements are placed on the shaft in the following sequence: gear/washers 54, 56, 58, drag washer 38, gear 32, drag washer 40, cup washers 75, 80, and transition ring 76. After the above elements are assembled, they are urged axially inwardly against each other until the inner gear/washer 54 abuts the shoulder 60 on the inner end of the shaft 30.

Figures 4, 5, 6, 7:
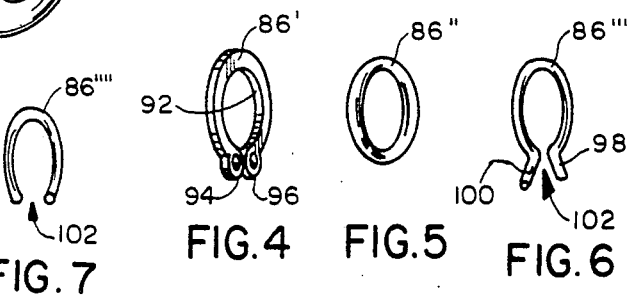
FIG. 4 is a perspective view of one type of retainer/blocking element according to the present invention.
FIG. 5 is a perspective view of a modified form of retainer/blocking element according to the present invention.
FIG. 6 is a perspective view of a still further modified form of retainer/blocking element according to the present invention.
FIG. 7 is a perspective view of a still further modified form of retainer/blocking element according to the present invention.

According to the invention, a retainer/blocking element 86 is then mounted on the shaft 30 to prevent sliding of the elements 54, 56, 58, 38, 32, 40, 78, 80 and 76 off of the free end of the shaft 30. The retainer/blocking element 86 can take any of a number of different forms. Several optional forms, contemplated by the invention, are shown in FIGS. 4-6 and identified consecutively as 86', 86" and 86"'. Each of the elements 86, 86', 86" and 86"' is designed to fit in an undercut 88 on the shaft 30, which undercut is preferably annular and continuous but for the interruption of the flats 90 on the shaft 30.

In FIG. 4, a snap ring 86' is shown. The effective diameter of the inside surface 92 of the snap ring 86' can be effectively enlarged by separating the free ends 94, 96 thereof, as by a conventional tool. The snap ring 86 placed in the undercut 88 will be prohibited from shifting axially relative to the shaft 30.

In FIG. 5, an O-ring 86" is shown. The O-ring 86" is preferably made from a rubber or other soft, elastic material. The O-ring 86" is not intended to prohibit separation of the elements of the drag stack/assembly 36 from the free end of the shaft 30 as does the snap ring 86', however, the O-ring 86" does embrace the shaft 30 with sufficient force that the elements of the drag stack/assembly 36 will not slide off of the shaft 30 by merely tipping the reel.

A further modified form of retainer/blocking element is shown at 86''' in FIG. 6. The element 86''' is also a C-type clip with offset ends 98, 100 which define a restricted opening 102 into which the shaft 30 can be forcibly advanced to seat the element 86'''.

In FIG. 7, a still further modified form of retainer/blocking element 86'''' is shown, which is the same as the retainer/blocking element 86''' with the exception that the retainer/blocking element 86'''' has no corresponding offset ends 98, 100.

Each of the retainer/blocking elements 86, 86', 86", 86''', 86'''' is configured to have a limited radial projection to thereby permit the body/sleeve 68 on the drag actuator 64 to surround and move axially relative thereto. To accomplish this, the sleeve/body 68 has a stepped through bore 102 with a first part 104 which closely surrounds the shaft 30 and, in FIG. 2, threadably engages the shaft 30, and a second part 106 having an inside surface 108 that has a diameter larger than the inside diameter of the first part 30 so as to define an annular space 108 around the shaft 30 to accommodate the retainer/blocking element 86, 86', 86", 86''', 86'''' throughout the range of movement of the drag actuator 64 between its no/low drag and high drag positions.

It can be seen that, with the inventive structure, the drag stack/assembly 36 can be simply assembled, after which the retainer/blocking element 86, 86', 86", 86''', 86'''' can be press fit/assembled to the shaft 30 to thereby hold the elements of the drag stack/assembly 36 in their operative position. The side cover 72 can be attached with the retainer/blocking element 86, 86', 86", 86''', 86'''' in place, after which the drag actuator 64 can be threaded onto the shaft 30. Removal of the drag actuator 64 does not release any elements of the drag stack/assembly 36. Similarly, the side cover 72 can be separated from the reel frame 12 and the retainer/blocking element 86, 86', 86", 86''', 86'''' will hold the drag stack/assembly 36 in its operative position, without fear of separation of any of the parts thereof. This permits the operator to gain access to the cavity 108 between the frame 12 and a side cover 72, as to repair other mechanisms on the reel, without fear of the elements of the drag stack/assembly 36 falling out.

The foregoing disclosure of specific embodiments is intended to be illustrative of the broad concepts comprehended by the invention.

We claim:

1. In a fishing reel of the type having a frame with a cover, a first shaft, a gear mounted on the first shaft, said gear having a bore therethrough so as to be mountable on the first shaft by direction of the first shaft free end through the gear bore and sliding of the gear in a first axial direction relative to the first shaft, at least one drag washer having a bore through which the first shaft extends and movable axially along the first shaft, a threadably connected drag actuator that is rotatable in a first rotational direction for advancing at least a part of the drag actuator in the first axial direction and as an incident thereof to increase drag by causing the gear and one drag washer to move against each other, said drag actuator being rotatable oppositely to the first rotational direction to decrease drag by allowing the gear and one drag washer to move away from each other, the improvement comprising:

means separate from said drag actuator, frame, and cover for blocking axial movement of at least one of the gear and one drag washer relative to the first shaft in a direction opposite to the first direction to prevent escape of the one of the gear and one drag washer by axial movement relative to the first shaft off of the free end of the first shaft, wherein the first shaft has an undercut and an outer surface radially outwardly of the undercut and the blocking means comprises an element that extends into said undercut and extends radially outwardly beyond the outer surface of the first shaft.

2. The improved fishing reel according to claim 1 wherein the blocking means comprises an O-ring.

3. The improved fishing reel according to claim 1 wherein the blocking means comprises a snap ring that at least partially surrounds the first shaft and has a curved inside surface that extends into the undercut.

4. The improved fishing reel according to claim 1 wherein the blocking means comprises a formed piece of wire.

5. The improved fishing reel according to claim 1 wherein said drag actuator is movable in an operating range relative to the first shaft between a no drag position and a full drag position and the blocking means and drag actuator are in axially overlapping relationship through at least a part of the operating range for said drag actuator.

6. The improved fishing reel according to claim 5 wherein the drag actuator has an annular sleeve that surrounds the blocking means.

7. The improved fishing reel according to claim 5 wherein the drag actuator has a through bore defining a stepped inside diameter including a first part having a first diameter which is threaded to the first shaft and a second part with a second diameter larger than the first diameter for surrounding the blocking means.

8. The improved fishing reel according to claim 1 wherein there are a plurality of drag washers, the one drag washer bears against one axial side of the gear and a second drag washer bears against the other axial side of the gear, one of the one and second drag washers being keyed against rotation relative to the first shaft, and as the drag actuator is rotated in said first rotational direction the drag actuator causes the gear to be captured between the one and second drag washers to thereby cause the gear to follow movement of the shaft.

9. The improved fishing reel according to claim 1 wherein the reel cover includes a side cover member and the drag actuator is threadably engaged with the side cover member.

10. The improved fishing reel according to claim 1 wherein the drag actuator is threadably engaged with the first shaft.

11. A fishing reel comprising:
a frame with a cover;
a rotatable spool;
a crank handle;
a first shaft with a first axis and a free end operable by the crank handle to cause rotation of the spool and to thereby direct line onto the spool;
a gear mounted on the shaft for rotation relative thereto about said first axis;
drag applying means on the shaft including at least one drag washer for applying a frictional force to the gear to thereby cause the gear to follow rotation of the first shaft, at least one gear and one drag washer being movable axially off of the free end of the first shaft;

a drag actuator for the drag applying means, said drag actuator being selectively movable between a no drag position and a full drag position; and means separate from said drag actuator, frame, and cover for blocking axial movement of the at least one of the gear and one drag washer axially off of the free end of the first shaft, wherein said first shaft has a radial undercut and the blocking means comprises an element extending into the undercut.

12. The improved fishing reel according to claim 11 wherein the blocking means comprises an O-ring.

13. The improved fishing reel according to claim 11 wherein the blocking means comprises a resilient O-ring.

14. The improved fishing reel according to claim 11 wherein the blocking means comprises a snap ring.

15. The improved fishing reel according to claim 11 wherein the drag actuator has an annular portion/sleeve that surrounds the first shaft and the drag actuator, said drag actuator having an operating range between said no drag and full drag position and the annular drag actuator portion is in axially overlapping relationship with the blocking means through at least part of the operating range for said drag actuator.

16. A method of assembling drag structure on a shaft on a fishing reel with a free end, said shaft having an outer surface, said method comprising the steps of:

placing at least one drag washer and a gear to be driven by the shaft over the free end of the shaft;

sliding the at least one drag washer and gear axially in a first direction relative to the shaft;

providing a retainer/blocking element having a curved inside surface;

placing the retainer/blocking element on the shaft so that the inside surface on the retainer/blocking element extends around the shaft outer surface to prevent the at least one drag washer and gear from sliding axially oppositely to said first direction and off of the free end of the shaft; and assembling a drag actuator on the shaft.

17. The method of assembling a drag assembly according to claim 16 wherein the step of placing a cover over the shaft and retainer/blocking element before the drag actuator is assembled.

18. The method of assembling a drag assembly according to claim 16 including the step of positioning the drag actuator so that at least a part of the drag actuator is in axially overlapping relationship with the retainer/blocking element.

19. The method of assembling a drag assembly according to claim 16 wherein the shaft has an undercut and the retainer/blocking element extends into the undercut.

20. The method of assembling a drag assembly according to claim 16 wherein the retainer/blocking element comprises an O-ring.

21. The method of assembling a drag assembly according to claim 16 wherein the retainer/blocking element comprises a snap ring.

* * * * *